Figure 1:
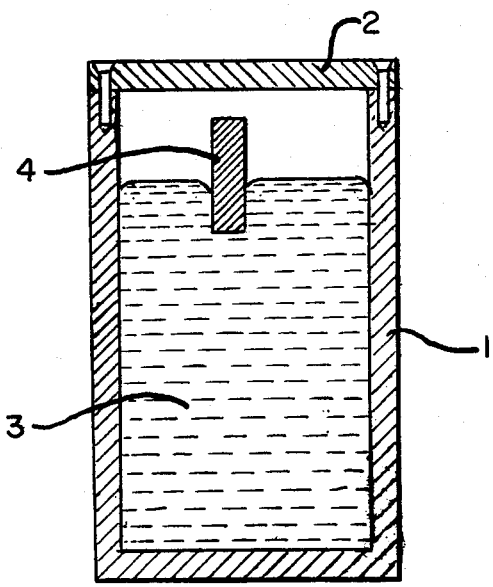

United States Patent [19]
Ortega

[11] Patent Number: 4,493,365
[45] Date of Patent: Jan. 15, 1985

[54] HEATING DEVICE WITH HEAT STORAGE

[75] Inventor: Francis Ortega, Brunoy, France

[73] Assignee: U.S. Philips Corporation, New York, N.Y.

[21] Appl. No.: 494,146

[22] Filed: May 12, 1983

[30] Foreign Application Priority Data

May 18, 1982 [FR] France ................................ 82 08686

[51] Int. Cl.³ .................... F28D 17/00; F24H 7/00; C09K 5/00
[52] U.S. Cl. ................................ 165/10 A; 126/400; 252/71
[58] Field of Search ............... 126/400, 436, 437, 430, 126/104.17; 165/10, 10 A; 252/70, 71

[56] References Cited

U.S. PATENT DOCUMENTS

| | | | |
|---|---|---|---|
| 3,596,034 | 7/1971 | Macjean | 165/10 A |
| 3,719,225 | 3/1973 | Macjean | 165/10 A |
| 3,998,059 | 12/1976 | Randell | 60/671 |
| 4,034,069 | 7/1977 | Curtis | 423/489 |

Primary Examiner—Samuel Scott
Assistant Examiner—G. Anderson
Attorney, Agent, or Firm—Rolf E. Schneider

[57] ABSTRACT

A heat storage device comprises a hermetically sealed metallic container having one or more molten alkali metal fluorides and/or alkaline earth metal fluorides included therein. A material having a carbon basis is also included in the metallic container to react with any oxygen present in the metallic container and thereby prevent corrosion of the metallic container by the molten fluorides.

5 Claims, 2 Drawing Figures

HEATING DEVICE WITH HEAT STORAGE

This invention relates to a heat storage device comprising a bath of one or more molten alkali metal fluorides and/or alkaline earth metal fluorides sealed in a gas-tight manner in a metallic container, heating means in thermal contact with the bath, and means serving to control heat transfer between said device and the exterior.

Such heat storage devices are well known in the art and their application by the public has increased considerably since the energy crisis and the rapid rise of a cost of the kilowatt hour. In fact such heat storage devices present the advantage of consuming electrical energy during the slack hours, generally at night, for which there is a reduced consumer charge and of releasing the resulting stored heat at will, normally during the peak hours, generally the day-time.

In said heat storage devices, the heat storing materials consist of substances capable of storing a maximum of calorific energy in a minimum volume, which are placed in an insulated container. These materials may be of many types, such as solids, for example refractory bricks or otherwise, or liquids, for example pressurised water, or even two-phase systems with a transition solid/liquid phase, for example salts, which may store a comparatively large quantity of heat in the form of latent melting heat.

The heat storage device according to the present invention relates to this latter type comprising substances or mixtures of substances having a melting-point in the operating temperature range, more specifically fluorides of alkali metals and/or alkaline earth metals. These substances or mixtures of substances are known as such in particular from U.S. Pat. No. 3,823,305 which describes the use of metal fluorides, for example LiF, or eutectic mixtures of metal fluorides, for example lithium fluoride, sodium fluoride, potassium fluoride, calcium fluoride and magnesium fluoride, the eutectic melting-point of which lies between 600° and 850° C.

These prior heat storage devices possess a latent disadvantage due to the corrosion of the metallic container in contact with the fluorides, in the presence of an atmosphere which is not free from oxygen. A solution to this problem consists in using salts from which all traces of oxygen have been removed and introducing said salts into a metallic container in an atmosphere of inert gas, before sealing it hermetically. This solution is complicated practice and comparatively expensive. Another solution, described in U.S. Pat. No. 3,962,407 consists in adding metallic aluminium to the fluoride bath.

However, even if the corrosion phenomena are suppressed by these means, other equally serious disadvantages still remain.

In fact, in storing heat energy in the form of latent heat at the high temperature melting-points of said fluoride salts, volume variations are produced both by voluminal expansion and by phase transition such that the walls of the metallic container are subjected to a heavy mechanical load.

Since the rupture of the metallic container at a high temperature constitutes an unthinkable risk in domestic applications, it is desirable to provide an arrangement which is also suitable to serve as an expansion inhibitor.

According to the present invention, the heat storage device is characterized in that in the metallic container includes a material having a carbon basis.

According to a first embodiment of the invention said carbon material is a piece of graphite.

In this embodiment said piece of graphite ensures the fixation of oxygen present in the metallic container and thus prevents the walls of the container from being corroded during contact with the fluorides.

According to a second embodiment, said carbon material is a graphite foil applied against the inner walls of the metallic container.

In this manner the graphite foil also acts as a cushion absorbing expansion.

Figure 2:
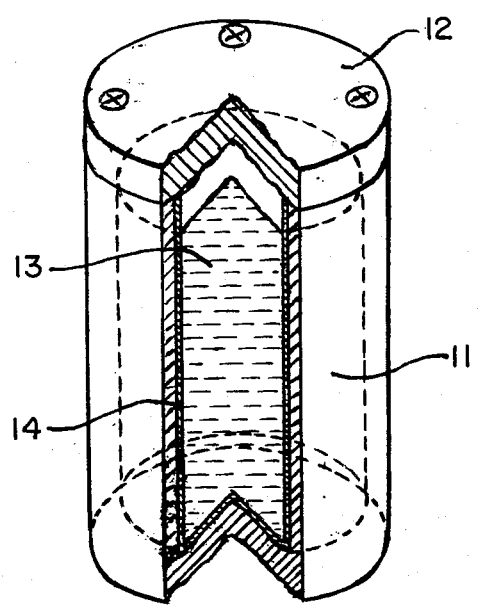

The invention will now be described in greater detail with reference to the accompanying drawing, in which:

FIG. 1 is a sectional view of a heat storage element device according to the present invention; and FIG. 2 is a partial sectional view of a modified heat storage device according to the invention.

A bath 3 of fluorides, for example, a eutectic comprising a ternary mixture of the fluorides of sodium, calcium and magnesium in the molar percentages: 64% $NaF+23\%$ $CaF_2+12\%$ $MgF_2$, the melting-point of which is approximately 745° C., is provided, as shown in FIG. 1, in the metallic container 1, preferably consisting of stainless steel, having a cover 2 which can be closed hermetically.

Generally, a heat storage arrangement is constituted by several storage devices, such as that shown in FIG. 1, disposed in a modular block filled with an insulating material, for example a porous ceramic material. Alternatively, such arrangement has a double wall in which at least one radiation screen is provided, while a hydrogen atmosphere the pressure of which may be controlled by means of an independent reservoir provided with a reversible hydrogen getter and heating means which are independent and controllable, may be introduced between the two walls so as to control the heat exchange between the storage arrangement and the exterior, which principle is described in U.S. Pat. No. 3,823,305.

If the salts or the atmosphere in the container is not free of oxygen, corrosion of metallic parts in contact with the fluoride bath occurs, which effect lead to a rupture of the container, more especially since it is subjected to a heavy mechanical load due to the increase in volume which the storage material experiences by heating and/or phase change.

According to the present invention, a material having a carbon basis is introduced into the container before closing it hermetically. The carbon material ensures the fixation of the oxygen present in the container in known manner as described for example in the publication "Advances in Molten Salt Chemistry", Vol. 3, p. 183, PLENUM PRESS, New York and London (1975). In this manner intergranular corrosion of the walls of the container no longer occurs.

According to a first embodiment, the carbon material comprises a piece of graphite, as shown at 4 in FIG. 1. Such a graphite piece has the advantage of floating on the surface of the fluoride bath 3 and not being wetted by it. In this case, however, it serves the same purpose as aluminium, namely the fixation of oxygen normally in the form of a gaseous oxide of carbon; however, while aluminium deposits at least partly on the surface of the metallic parts in contact with the bath in a protective layer, the carbon fixes the oxygen in the form of a gas.

In the case of an excess of aluminium, the metallic surfaces in contact with the bath may be attacked due to the dissolution of certain components. Graphite does not present this disadvantage since even in excess it remains as such, at least in the temperature range employed.

According to a modified embodiment of the invention, as shown in FIG. 2, said carbon material is utilized in the form of a foil of graphite 14 applied against the inner walls of the metallic container 11. Such foil 14 may be constituted either in the form of a ribbon of "papyex" (commercially available from the firm Le Carbone Lorraine) or preferably, because of its greater thickness (up to 1,3 mm) as a graphite felt or a graphite foam.

In this case the carbon material plays the part of a cushion absorbing expansion between the metallic container and the fluoride in addition to its function of a reducing agent. Due to the significant temperature variations between roughly 0° and 1000° C. and the differences in the coefficients of expansion, the metallic container is subject to heavy mechanical loads. Whereas in the liquid state the molten salt may expand within the container 11, which is intentionally not filled entirely, in the solid state the salt presses against the walls of the container 11 considerably, which effect in certain cases may lead to rupture. The graphite felt which can be compressed materially thus permits obtaining the few millimeters necessary for the expansion of the fluoride salt 13 up to its change into the liquid state. A cover 12 also ensures a hermetic seal.

What is claimed is:

1. A heat storage device, which comprises a hermetically sealed metallic container; one or more molten alkali metal fluorides and/or alkaline earth metal fluorides included in the metallic container; and a material having a carbon basis also included in the metallic container, said carbon-basis material reacting with any oxygen present in the metallic container and thereby preventing corrosion of the metallic container by the molten fluorides.

2. A heat storage device according to claim 1, in which the carbon-basis material comprises a piece of graphite.

3. A heat storage device according to claim 1, in which the carbon-basis material comprises a foil of graphite applied against the inner walls of the metallic container.

4. A heat storage device according to claim 4, in which the graphite foil comprises spongy carbon.

5. A heat storage device according to claim 4, in which the graphite foil comprises carbon felt.

* * * * *